US010976993B2

(12) United States Patent
Hiramatsu

(10) Patent No.: US 10,976,993 B2
(45) Date of Patent: Apr. 13, 2021

(54) AUDIO CONTROL SYSTEM AND AUDIO CONTROL METHOD

(71) Applicant: Yazaki Corporation, Tokyo (JP)

(72) Inventor: Ryo Hiramatsu, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/820,994

(22) Filed: Mar. 17, 2020

(65) Prior Publication Data

US 2020/0334002 A1    Oct. 22, 2020

(30) Foreign Application Priority Data

Apr. 19, 2019   (JP) ............................. JP2019-079734

(51) Int. Cl.
*H04B 1/00*    (2006.01)
*G06F 3/16*    (2006.01)
*G06K 9/00*    (2006.01)
*H04R 5/02*    (2006.01)
*B60R 11/02*   (2006.01)

(52) U.S. Cl.
CPC .......... *G06F 3/165* (2013.01); *B60R 11/0217* (2013.01); *G06K 9/00832* (2013.01); *H04R 5/02* (2013.01); *H04R 2499/13* (2013.01)

(58) Field of Classification Search
CPC ...................................................... H04B 1/00
See application file for complete search history.

(56) References Cited

U.S. PATENT DOCUMENTS

| 5,801,763 | A | * | 9/1998 | Suzuki | ................. | A61B 5/1176 |
| | | | | | | 340/439 |
| 2004/0036764 | A1 | * | 2/2004 | Hirota | ................. | G01C 21/3641 |
| | | | | | | 348/77 |
| 2005/0226472 | A1 | * | 10/2005 | Komura | ................. | B60R 25/255 |
| | | | | | | 382/118 |
| 2014/0097957 | A1 | * | 4/2014 | Breed | ................. | G08B 21/0407 |
| | | | | | | 340/576 |
| 2017/0240022 | A1 | * | 8/2017 | Ireri | ................... | B60H 1/00742 |
| 2018/0126901 | A1 | * | 5/2018 | Levkova | ............ | G06K 9/00597 |
| 2018/0319279 | A1 | * | 11/2018 | Ikeda | ................. | G06K 9/00845 |

(Continued)

FOREIGN PATENT DOCUMENTS

JP    9-83277 A    3/1997

*Primary Examiner* — Olisa Anwah
(74) *Attorney, Agent, or Firm* — Sughrue Mion, PLLC

(57) ABSTRACT

Audio control system and audio control method that can appropriately control sound volume of an audio part while preventing inaccurate determination regarding condition of a passenger are provided. An audio control system includes an audio part installed in a compartment of a vehicle, a photographing part that photographs the compartment from a front side reference position in the compartment and obtains a photographed image also representing distance to an object within a photographing range in the compartment, a determination part that determines, based on the photographed image obtained by the photographing part, at least one of whether or not a passenger other than a driver in the vehicle is asleep and whether or not the passenger is making a call on a mobile phone, and a control part that turns down sound volume of the audio part if the determination part determined the passenger is asleep or making a call.

6 Claims, 5 Drawing Sheets

(56) References Cited

U.S. PATENT DOCUMENTS

| | | | |
|---|---|---|---|
| 2019/0009675 A1* | 1/2019 | Groleau | B60K 37/06 |
| 2019/0147263 A1* | 5/2019 | Kuehnle | G07C 5/0808 |
| | | | 340/439 |
| 2019/0355339 A1* | 11/2019 | Seffernick | B60N 2/803 |
| 2019/0357834 A1* | 11/2019 | Aarts | G08B 21/06 |
| 2020/0097169 A1* | 3/2020 | Diaz | G09G 3/36 |
| 2020/0142407 A1* | 5/2020 | Kozloski | G05D 1/0223 |
| 2020/0151470 A1* | 5/2020 | Shen | G06K 9/00832 |

* cited by examiner

AUDIO CONTROL SYSTEM AND AUDIO CONTROL METHOD

BACKGROUND OF THE INVENTION

Field of the Invention

The present invention relates to an audio control system and an audio control method for controlling sound volume of an audio part installed in a compartment of a vehicle.

Description of the Related Art

In a vehicle, there are some cases in which it is preferable to appropriately turn down the sound volume of an audio part installed in a compartment, for example when a passenger on a front passenger seat and/or on a rear seat is asleep.

Thus, there has been proposed a technology for determining whether the passenger is asleep or not based on a photographed image of an interior of the compartment and appropriately turning down the sound volume of the audio part based on the determined results (for example, refer to Patent Document 1 listed below). According to this technology, the sound volume of the audio part can automatically be set to a level that does not disturb the passenger's sleep.

CITATION LIST

Patent Document
 Patent Document 1: JP H9-83277 A

SUMMARY OF THE INVENTION

Technical Problem

In the above-mentioned technology, a condition of the passenger is determined based on the two-dimensional photographed image photographed by a compartment camera. However, such technology has a drawback that it may not accurately determine that the passenger is asleep when, for example, a head of the passenger who is asleep is moving in a front-back direction not a left-right direction or up-down direction, leaving room for improvement in terms of preventing inaccurate determination regarding the condition of the passenger.

In view of the above-described problem, an object of the present invention is to provide an audio control system and an audio control method which can appropriately control the sound volume of an audio part while preventing inaccurate determination regarding a condition of a passenger.

Solution to Problem

In order to achieve the above-described object, an audio control system according to the present invention includes an audio part installed in a compartment of a vehicle, a photographing part that photographs the compartment from a front side reference position in the compartment and that obtains a photographed image also representing a distance to an object within a photographing range in the compartment, a determination part that determines, based on the photographed image obtained by the photographing part, at least one of whether or not a passenger other than a driver in the vehicle is asleep and whether or not the passenger is making a call on a mobile phone, and a control part that turns down sound volume of the audio part if the determination part has determined that the passenger is asleep or making a call.

Further, in order to achieve the above-described object, an audio control method according to the present invention includes a photographing step of photographing a compartment of a vehicle from a front side reference position in the compartment and obtaining a photographed image that also represents a distance to an object within a photographing range in the compartment, a determination step of determining, based on the photographed image obtained in the photographing step, at least one of whether or not a passenger other than a driver in the vehicle is asleep and whether or not the passenger is making a call on a mobile phone, and a control step of turning down sound volume of an audio part installed in the compartment if it was determined that the passenger is asleep or making a call in the determination step.

Advantageous Effect of the Invention

According to the audio control system and the audio control method of the present invention, the photographed image that also represents a distance to an object within a photographing range, i.e., a three-dimensional photographed image that includes information in the front-rear direction in addition to the information in the left-right and up-down direction, can be obtained by performing the photographing. Consequently, in the determination regarding the condition of the passenger such as the conditions of asleep and making a call, the movement of the respective parts of the passenger in the front-rear direction can be used as information to make the determination, thereby preventing inaccurate determination. In addition, the sound volume of the audio part is turned down in accordance with the determination results obtained while preventing such inaccurate determination. That is, according to the audio control system and the audio control method of the present invention, the sound volume of the audio part can be appropriately controlled while preventing inaccurate determination regarding the condition of the passenger.

DESCRIPTION OF EXEMPLARY EMBODIMENTS

In the following, one embodiment of an audio control system and an audio control method will be explained.

Figure 1:
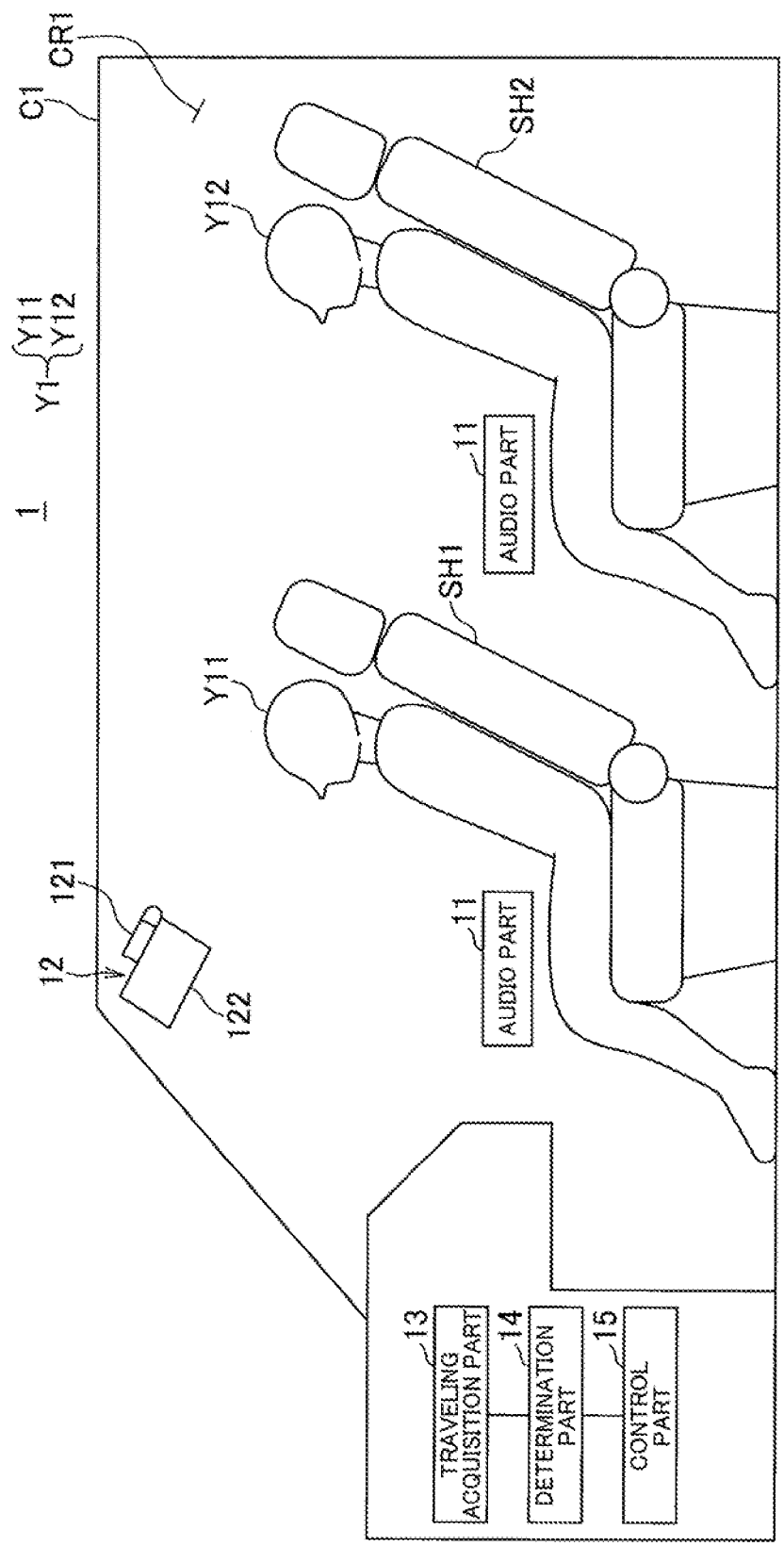
FIG. 1 is a schematic diagram showing one embodiment of an audio control system.
Figure 2:
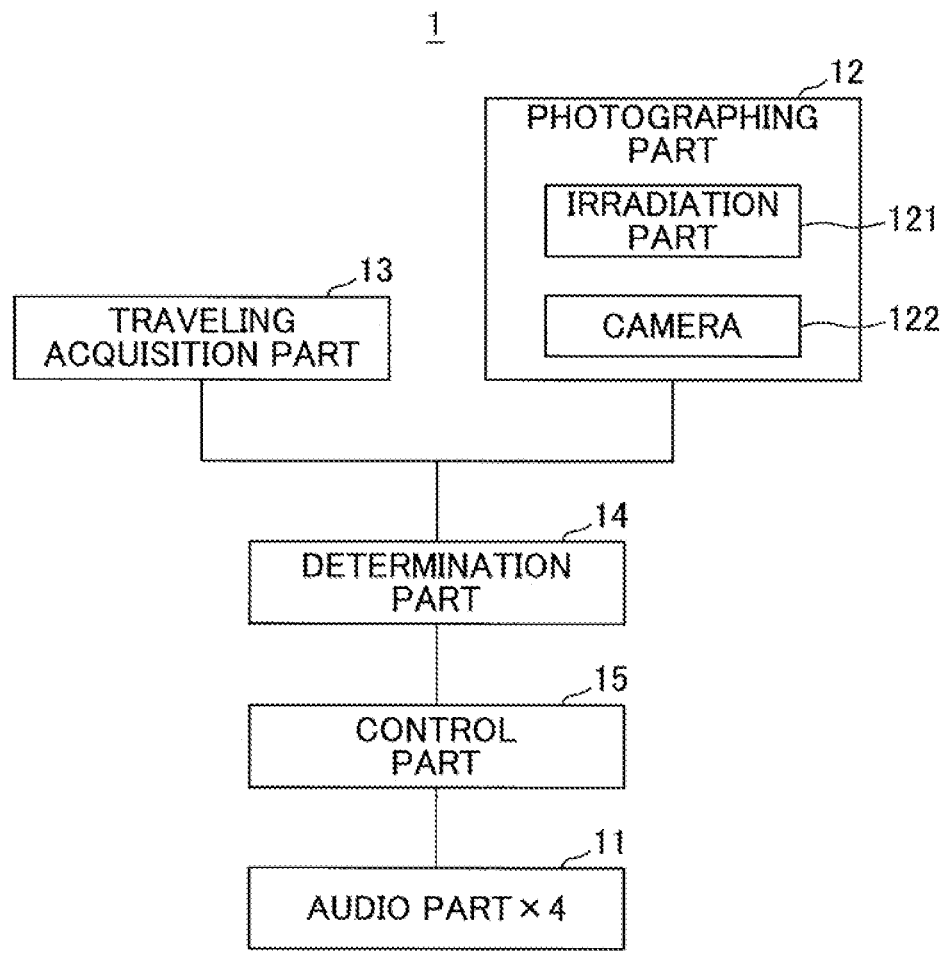
FIG. 2 is a schematic block diagram of the audio control system shown in FIG. 1.

FIG. 1 is a schematic diagram showing one embodiment of an audio control system. FIG. 2 is a schematic block diagram of the audio control system shown in FIG. 1.

The audio control system 1 of this embodiment is configured to control sound volume of an audio part 11 installed in a compartment CR1 of a vehicle C1. This audio control system 1 includes the audio part 11, a photographing part 12, a travelling acquisition part 13, a determination part 14 and a control part 15.

The audio part 11 is a device that is installed at the compartment CR1 of the vehicle C1 to produce music and such and is installed at total of four locations, i.e., two locations on the sides of the front seats SH1 in the compartment CR1 and two locations on the sides of the rear seat SH2 in the compartment CR1.

The photographing part 12 photographs an interior of the compartment CR1 from a front side reference position in the compartment CR1, and acquires a photographed image that also represents a distance to an object within a photographing range in the compartment CR1. The photographing part 12 includes an irradiation part 121 that irradiates infrared rays and a camera 122 capable of photographing an image of an infrared region, so as to enable photographing even if it is dark inside the compartment CR1. Although not specified herein, the camera 122 may be, for example, a conventionally known camera having a distance measurement function such as a stereo camera and a TOF (Time-of-Flight) camera.

The camera 122 is installed in the vicinity of an upper edge of a front windshield FG1 such that both of front seat passengers Y11 seated on the front seats SH1 and a rear seat passenger Y12 seated on the rear seat SH2 fall within the photographing range. This installation position corresponds to the front side reference position in this embodiment. The irradiation part 121 is attached to this camera 122 so the photographing range of the camera 122 can be sufficiently covered.

The travelling acquisition part 13 acquires a traveling condition of the vehicle C1 based on at least one of a steering wheel operation and a braking operation of the vehicle C1. Herein, the traveling condition means, for example, traveling in a curve of the vehicle C1 according to the steering wheel operation, decelerating/stopping according to the braking operation, and accelerating/starting. In this embodiment, this traveling acquisition part 13 commonly mounted as a device for acquiring the condition of the vehicle C1 is utilized.

Based on the photographed image obtained by the photographing part 12, the determination part 14 determines whether or not a passenger Y1 of the vehicle C1 other than a driver, such as the front seat passenger Y11 and/or the rear seat passenger Y12, is asleep, or determines whether or not this passenger Y1 is making a call on a mobile phone.

The determination part 14 performs, in two ways, the following determinations regarding whether or not the passenger Y1 is asleep. A first determination is that, for the passenger Y1 who is captured in the photographed image, if the movement of the head is detected as in synchronization with the traveling condition acquired by the traveling acquisition part 13 to a predetermined degree or to more than the predetermined degree, then it is determined that the passenger Y1 is asleep. A second determination is that, for the passenger Y1 who is captured in the photographed image, if a condition with eyes closed is continuously detected for a predetermined duration, then it is determined that the passenger Y1 is asleep.

Further, the determination part 14 performs the next determination regarding whether or not the passenger Y1 is making a call on a mobile phone. That is, for the passenger Y1 who is captured in the photographed image, if a posture in which his/her hand is put on the side of the head is continuously detected for a predetermined duration, then the determination part 14 determines this passenger Y1 is making a call.

The control part 15 controls the sound volume of the audio part 11 based on the determination result at the determination part 14. That is, if the determination part 14 has determined that the passenger Y1 is asleep or making a call, then the control part 15 turns down the sound volume of the audio part 11 in the vicinity of that passenger Y1 below a threshold value.

Of the constituent elements of the audio control system 1 explained above, the determination part 14 and the control part 15 are function blocks constructed in an ECU (Electronic Control Unit) mounted on the vehicle C1. Further, the traveling acquisition part 13 includes a motion detection part attached to a steering wheel mechanism and/or a braking mechanism, and a condition identify part constructed in the ECU as a function block and configured to identify the traveling condition based on the detected results from the motion detection part.

Next, an audio control method performed by this audio control system 1 will be explained.

Figure 3:
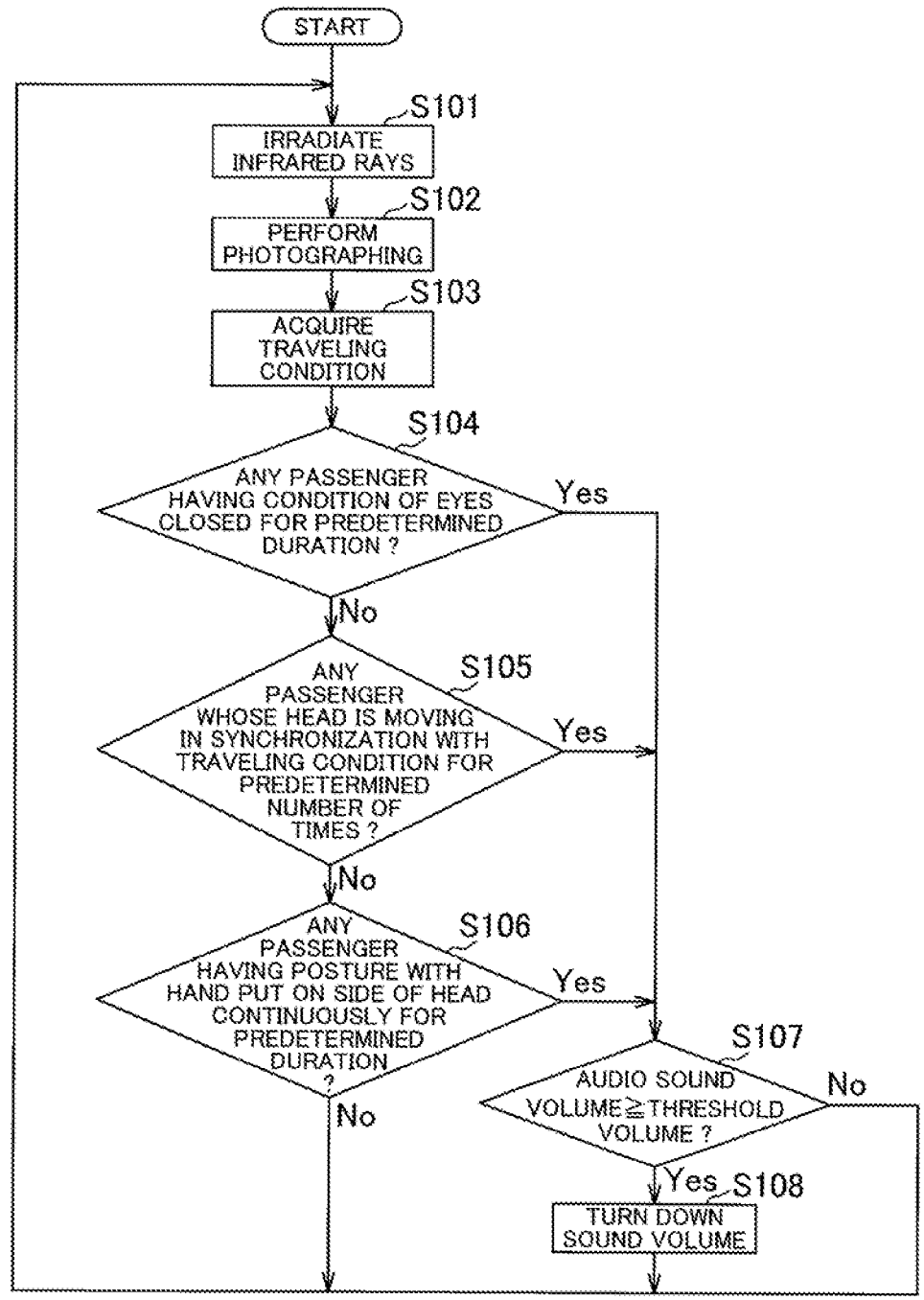
FIG. 3 is a flowchart showing a process flow of an audio control method performed by the audio control system shown in FIG. 1 and FIG. 2.

FIG. 3 is a flowchart showing a process flow of the audio control method performed by the audio control system shown in FIG. 1 and FIG. 2.

The audio control method shown in FIG. 3 is started when power is supplied to the ECU of the vehicle C1. After the start of the process, the irradiation of the infrared rays by the irradiation part 121 of the photographing part 12 (step S101), the photographing by the camera 122 under the irradiation of the infrared rays (step S102), and the acquisition of the traveling condition by the traveling acquisition part 13 (step S103), are performed. The process at steps S101 and S102 corresponds to an example of the photographing process to take a photograph of the compartment CR1 from the front side reference position in the compartment CR1 of the vehicle C1 and acquire the photographed image that also represents a distance to an object in the compartment CR1. Further, the process at step S103 corresponds to an example of the traveling acquisition process to acquire the traveling condition of the vehicle C1 based on at least one of the steering wheel operation and the braking operation of the vehicle C1.

Next, the determination part 14 determines whether or not there is a passenger Y1 other than a driver who is continuously detected, from the photographed image, as having a condition of eyes closed for a predetermined duration (step S104). If it is determined that there is no such passenger Y1 (i.e., "No" at step S104), then the process proceeds to step S105, and the determination part 14 performs the following determination. That is, in the process at step S105, the determination part 14 determines whether or not there is a passenger Y1 other than a driver whose movement of the head is detected, from the photographed image, as in synchronization with the traveling condition acquired by the traveling acquisition part 13 to a predetermined degree or more than the predetermined degree. Whether or not the movement of the head of the passenger Y1 is synchronized with the traveling condition to the predetermined degree or to more than the predetermined degree, is determined based on whether or not the photographed image has captured the movement of the head in synchronization with the traveling condition for more than a predetermined number of times, wherein the direction of the movement of the head may include any directions including the left-right direction, the up-down direction and the front-back direction.

If it is determined that there is no passenger Y1 whose head is moving in synchronization as described above (i.e., "No" at step S105), then the process proceeds to step S106, and the determination part 14 performs the following determination. That is, the determination part 14 determines whether or not there is a passenger Y1 other than a driver who is continuously detected, from the photographed image, as having a posture with his/her hand put on the side of the head for a predetermined duration.

If it is determined that there is no passenger Y1 who has such movement as described above (i.e., "No" at step S106), then the process returns back to step S101 without turning down the sound volume of the audio part 11, and the subsequent process is repeated.

Meanwhile, if it is determined that there is a passenger Y1 who is eligible for the determination at any of steps S104 to S106 (i.e., "Yes" at any of steps S104 to S106), then the process proceeds to step S107, where the control part 15 performs the following determination. That is, the control part 15 determines whether or not a set value of sound volume for the audio part 11 in the vicinity of this passenger Y1 among the audio parts 11 at the four locations, is equal to or greater than a predetermined threshold value. This threshold value corresponds to an upper limit value of the sound volume that empirically does not disturb the passenger Y1 other than the driver while sleeping or making a call.

The process at steps S104 to S106 corresponds to one example of a determination step that determines, based on the photographed image, whether or not the passenger Y1 other than the driver is asleep and whether or not this passenger Y1 is making a call on a mobile phone.

If the set value for the sound volume is less than this threshold value (i.e., "No" at step S107), then the process returns back to step S101 without turning down the sound volume of the audio part 11, and the subsequent process is repeated. Meanwhile, if the set value for the sound volume is equal to or greater than the threshold value (i.e., "Yes" at step S107), then the control part 15 turns down the set value of the sound volume of the audio part 11 concerned to a predetermined reduced sound volume value which is less than the threshold value (step S108). After that, the process returns back to step S101 and the subsequent process is repeated. The process at steps S107 and S108 corresponds to one example of a control step to turn down the sound volume of the audio part 11 installed in the compartment CR1 when it is determined that the passenger Y1 is asleep or making a call.

Figure 4:
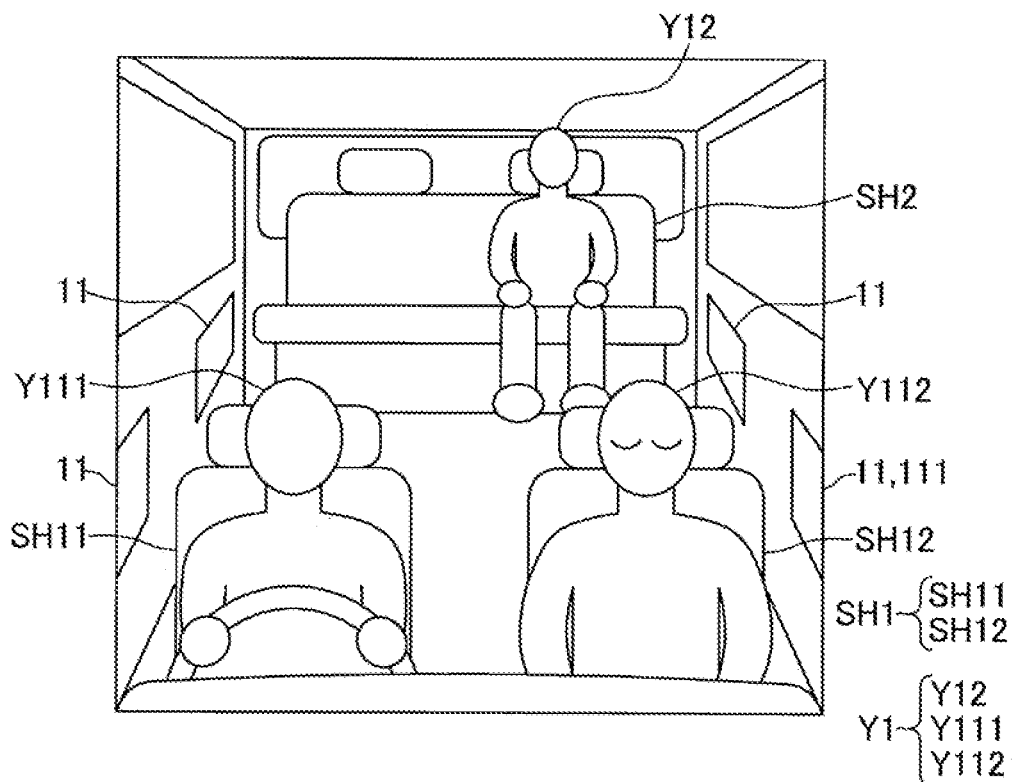
FIG. 4 is a schematic diagram showing a first exemplary case where sound volume is turned down by the audio control system shown in FIG. 1 and FIG. 2 and the audio control method shown in FIG. 3.

FIG. 4 is a schematic diagram showing a first exemplary case where the sound volume is turned down by the audio control system shown in FIG. 1 and FIG. 2 and the audio control method shown in FIG. 3.

In the first exemplary case shown in FIG. 4, three passengers Y1 are shown, and among the front seats SH1, a driver Y111 is seated on a driver's seat SH11, a front seat passenger Y112 is seated on a front passenger seat SH12, and a rear seat passenger Y12 is seated on a rear seat SH2. In this exemplary case, eyes of the front seat passenger Y112 are closed, and, if such condition is continuously detected for a predetermined duration, then it is determined that he/she is asleep. At this time, if the set value of the sound volume of the audio part 111 in the vicinity of the front seat passenger Y112 among the audio parts 11 at the four locations is equal to or greater than the above-described threshold value, then this sound volume is turned down to the reduced sound volume value which is less than this threshold value.

Figure 5:
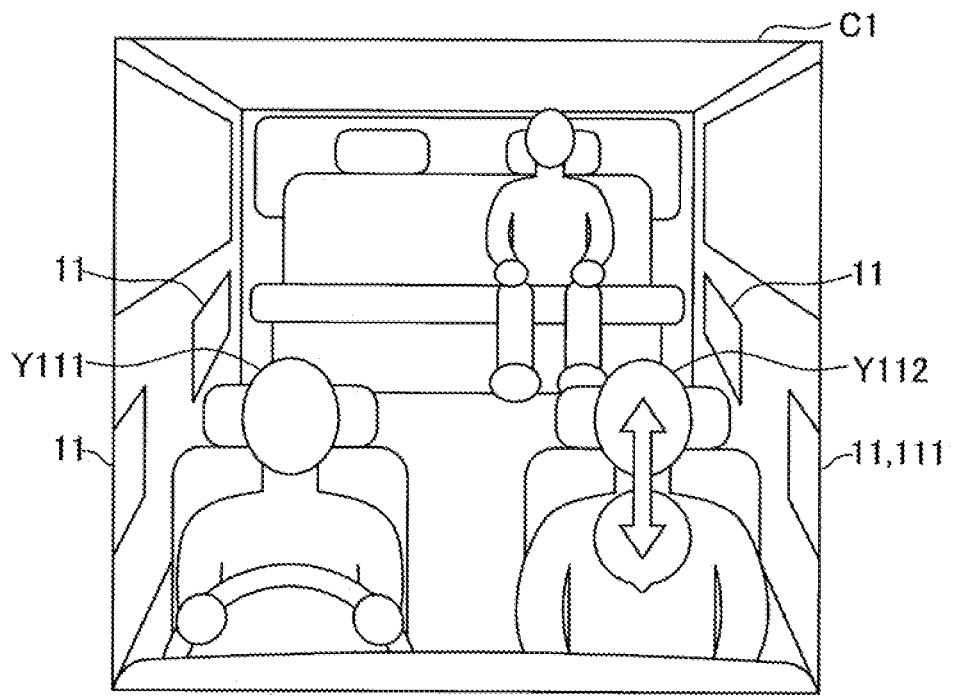
FIG. 5 is a schematic diagram showing a second exemplary case where sound volume is turned down by the audio control system shown in FIG. 1 and FIG. 2 and the audio control method shown in FIG. 3.

FIG. 5 is a schematic diagram showing a second exemplary case where the sound volume is turned down by the audio control system shown in FIG. 1 and FIG. 2 and the audio control method shown in FIG. 3.

In the second exemplary case shown in FIG. 5 also, it is determined that the front seat passenger Y112 among the passengers Y1 other than the driver Y111 is asleep. In the second exemplary case, a head of the front seat passenger Y112 is moving, with respect to the front-rear direction of the vehicle C1, in synchronization with the traveling condition such as deceleration by the braking operation and acceleration. If such movement of the head is detected from the photographed image for more than a predetermined number of times, then it is determined that the front seat passenger Y112 is asleep. Then, if the set value of the sound volume of the audio part 111 in the vicinity of the front seat passenger Y112 among the audio parts 11 at the four locations is equal to or greater than the above-described threshold value, then this sound volume is turned down to the reduced sound volume value which is less than this threshold value.

Figure 6:
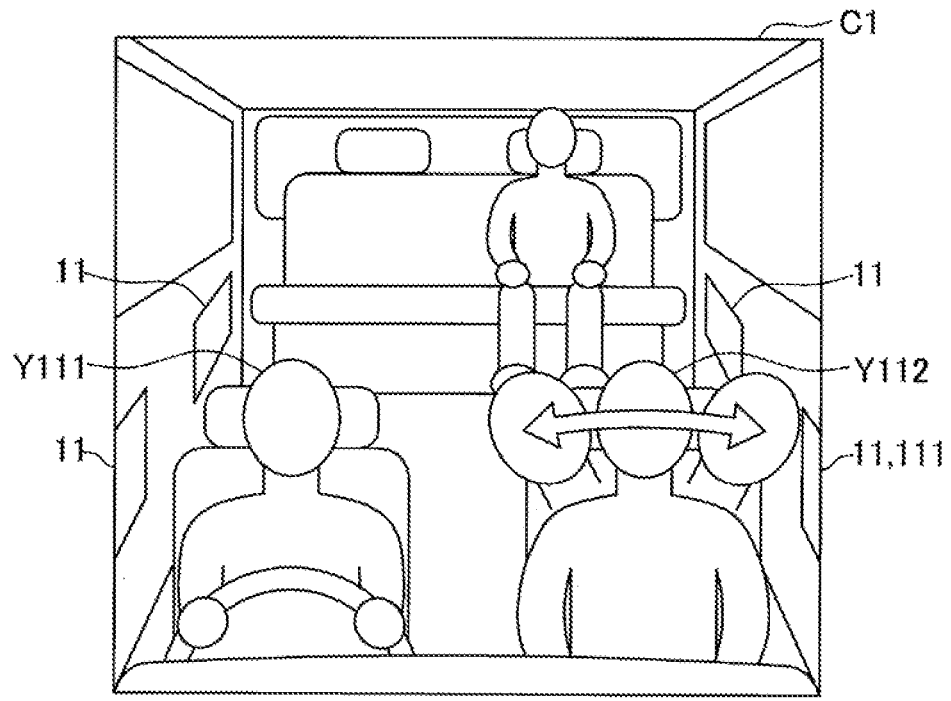
FIG. 6 is a schematic diagram showing a third exemplary case where sound volume is turned down by the audio control system shown in FIG. 1 and FIG. 2 and the audio control method shown in FIG. 3.

FIG. 6 is a schematic diagram showing a third exemplary case where the sound volume is turned down by the audio control system shown in FIG. 1 and FIG. 2 and the audio control method shown in FIG. 3.

In the third exemplary case shown in FIG. 6 also, it is determined that the front seat passenger Y112 among the passengers Y1 other than the driver Y111 is asleep. In the third exemplary case, a head of the front seat passenger Y112 is moving, with respect to the left-right direction corresponding to a width direction of the vehicle C1, in synchronization with the traveling condition such as traveling in the curve by the steering wheel operation. If such movement of the head is detected from the photographed image for more than a predetermined number of times, then it is determined that the front seat passenger Y112 is asleep. Then, if the set value of the sound volume of the audio part 111 in the vicinity of the front seat passenger Y112 among the audio parts 11 at the four locations is equal to or greater than the above-described threshold value, then this sound volume is turned down to the reduced sound volume value which is less than this threshold value.

Figure 7:
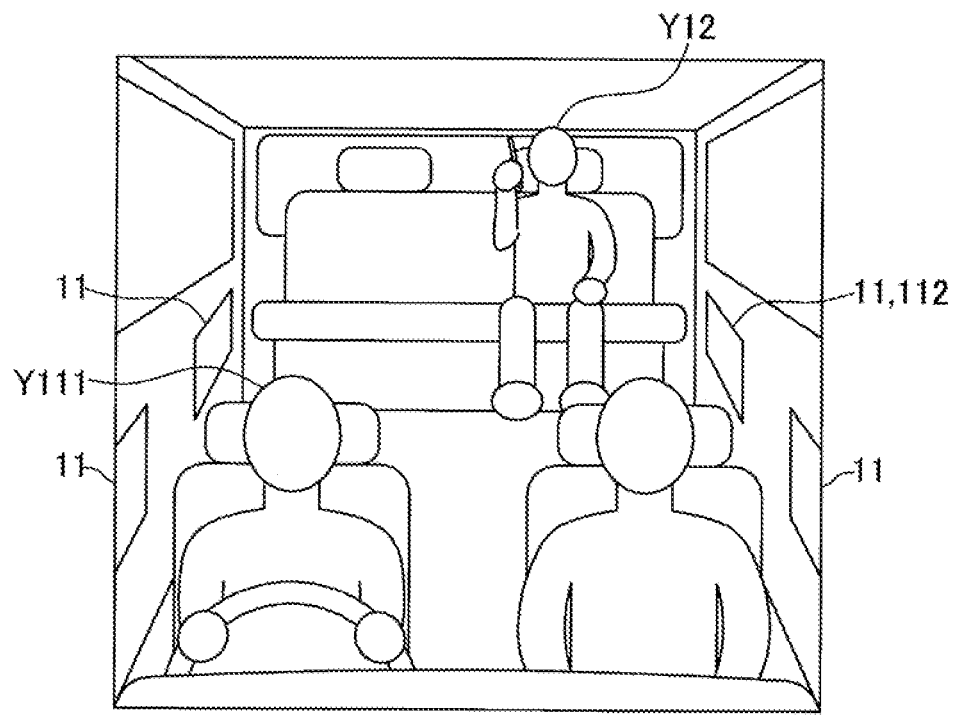
FIG. 7 is a schematic diagram showing a fourth exemplary case where sound volume is turned down by the audio control system shown in FIG. 1 and FIG. 2 and the audio control method shown in FIG. 3.

FIG. 7 is a schematic diagram showing a fourth exemplary case where sound volume is turned down by the audio control system shown in FIG. 1 and FIG. 2 and the audio control method shown in FIG. 3.

In the fourth exemplary case shown in FIG. 7, it is determined that the rear seat passenger Y12 among the passengers Y1 other than the driver Y111 is making a call on a mobile phone. In the fourth exemplary case, the rear seat passenger Y12 is having a posture in which his/her hand is put on the side of the head. If such posture is continuously detected from the photographed image for a predetermined duration, then it is determined that the rear seat passenger Y12 is making a call. Then, if the set value of the sound volume of the audio part 112 in the vicinity of the rear seat passenger Y12 among the audio parts 11 at the four locations is equal to or greater than the above-described threshold value, then this sound volume is turned down to the reduced sound volume value which is less than this threshold value.

According to the audio control system 1 and the audio control method of the embodiment described above, the photographed image that also represents a distance to an object within a photographing range, i.e., a three-dimensional photographed image that includes information in the front-rear direction in addition to the information in the left-right and up-down direction, can be obtained by performing the photographing. Consequently, in the determination regarding the condition of the passenger Y1 such as the conditions of asleep and making a call, the movement of the respective parts of the passenger Y1 in the front-rear direction can be used as information to make the determination, thereby preventing inaccurate determination. In addition, the sound volume of the audio part 11 is turned down in accordance with the determination results obtained while preventing such inaccurate determination. That is, according to this embodiment, the sound volume of the audio part 11 can be appropriately controlled while preventing inaccurate determination regarding the condition of the passenger Y1.

Herein, in this embodiment, the traveling acquisition part 13 is provided to acquire the traveling condition of the vehicle C1 based on at least one of the steering wheel operation and the braking operation. Further, for the passenger Y1 captured in the photographed image, if the movement of the head in synchronization with the traveling condition to a predetermined degree or to more than the predetermined degree is detected, then the determination part 14 determines that this passenger Y1 is asleep. In this determination, the determination regarding whether or not the passenger is asleep is performed based on the passive movement of the head that is in synchronization with the traveling condition, which is specific to the passenger Y1 who is asleep, thereby effectively preventing inaccurate determination in this determination regarding sleep.

Further, according to this embodiment, since the determination regarding whether or not the passenger Y1 is asleep is performed also based on the condition of eyes, inaccurate determination regarding sleep can be prevented effectively even when the head is only moving a little.

Further, according to this embodiment, the determination regarding making a call is performed based on the posture in which his/her hand is put on the side of the head continuously for a predetermined duration which is specific to the passenger Y1 who is making a call. Thus, inaccurate determination in this determination regarding making a call can also be prevented effectively.

Further, in this embodiment, the photographing part 12 includes the irradiation part 121 that irradiates infrared rays and the camera 122 capable of photographing an image of an infrared region. According to such photographing device, the image of the infrared region can be photographed even if it is dark inside the compartment CR1, allowing to perform the determination regarding the condition of the passenger in a further accurate fashion.

The embodiment described above is only a representative embodiment of the audio control system and the audio control method of the present invention, and the audio control system and the audio control method of the present invention are not limited to this embodiment and can be modified in various ways.

For example, in the embodiment described above, the exemplary audio control system 1 includes the audio parts 11 installed at total of four locations, i.e., two locations on the sides of the front seats SH1 in the compartment CR1 and two locations on the sides of the rear seat SH2 in the compartment CR1. Further, the exemplary photographing part 12 includes the camera 122 installed such that the front side reference position corresponds to the vicinity of the upper edge of the front windshield FG1, and the irradiation part 121 attached to this camera 122. However, the installation positions of the respective components are not limited to the installation position of the above-described embodiment, and any installation position is possible as long as it meets the demanded performance of the respective components.

Further, the embodiment described above shows by way of example the determination part 14 and the control part 15 constructed in the ECU mounted on the vehicle C1, and the traveling acquisition part 13 having a part of its function constructed in the ECU. However, the construction location of all or a part of these components is not limited to the ECU, and may be a computer device and such mounted on the vehicle C1 separately from the ECU.

Further, the embodiment described above shows by way of example performing both of the determination regarding sleep and the determination regarding making a call for triggering the control of the sound volume of the audio part 11. However, the determination that triggers the control of the sound volume of the audio part 11 is not limited to this, and may be at least one of the determination regarding whether or not the passenger is asleep and the determination regarding whether or not the passenger is making a call on a mobile phone.

Further, in the embodiment described above, the determinations regarding sleep and making a call are performed in an order of: the determination regarding sleep based on the condition of eyes; the determination regarding sleep based on the movement of the head; and the determination regarding making a call based on the movement of the hand, as shown in steps S104 to S106 in the flowchart shown in FIG. 3. However, the order of the determinations regarding sleep and making a call is not limited to this, and may be set arbitrarily even when performing a plurality of determinations in combination as this embodiment.

Further, the embodiment described above shows by way of example the audio control system 1 and the audio control method that determine that the passenger Y1 is asleep if the movement of his/her head is detected as in synchronization with the traveling condition acquired by the traveling acquisition part 13 to a predetermined degree or to more than the predetermined degree. Further, in this embodiment, it is determined that the passenger Y1 is asleep also if the condition in which eyes of the passenger Y1 are closed is continuously detected for a predetermined duration. However, the audio control system and the audio control method are not limited to this, and may include any determination technique even when performing the determination of whether or not the passenger Y1 is asleep based on the photographed image. However, the technique described above that considers the condition specific to the passenger who is asleep can effectively prevent inaccurate determination in the determination regarding sleep, as described above.

Further, the embodiment described above shows by way of example the audio control system 1 and the audio control method that determine that the passenger Y1 is making a call if the posture in which the passenger Y1 is putting his/her hand on the side of the head is continuously detected for a predetermined duration. However, the audio control system and the audio control method are not limited to this, and may include any technique even when performing the determination of whether or not the passenger Y1 is making a call based on the photographed image. However, the technique described above that considers the condition specific to the passenger who is making a call on a mobile phone can effectively prevent inaccurate determination in the determination regarding making a call, as described above.

Further, the embodiment described above shows by way of example the audio control system 1 and the audio control method that acquire the photographed image by irradiating the infrared rays and photographing the image of the infrared region. However, the audio control system and the audio control method are not limited to this, and may include photographing only an image of a visible light region. However, photographing the image of the infrared region allows the determination regarding the condition of the passenger Y1 to be performed in a further accurate fashion even when it is dark inside the compartment.

LIST OF REFERENCE SIGNS 1 audio control system
11 audio part
12 photographing part
13 traveling acquisition part
14 determination part
15 control part
121 irradiation part
122 camera
C1 vehicle
CR1 compartment
SH1 front seat
SH2 rear seat
Y1 passenger
Y111 driver
Y112 front seat passenger
Y12 rear seat passenger

What is claimed is:

1. An audio control system comprising:
an audio part installed in a compartment of a vehicle;
a photographing part that photographs the compartment from a front side reference position in the compartment and that obtains a photographed image also representing a distance to an object within a photographing range in the compartment;
a determination part that determines, based on the photographed image obtained by the photographing part, whether or not a passenger other than a driver in the vehicle is making a call on a mobile phone; and
a control part that turns down sound volume of the audio part if the determination part has determined that the passenger is making a call.

2. An audio control system comprising:
an audio part installed in a compartment of a vehicle;
a photographing part that photographs the compartment from a front side reference position in the compartment and that obtains a photographed image also representing a distance to an object within a photographing range in the compartment;
a determination part that determines, based on the photographed image obtained by the photographing part, whether or not a passenger other than a driver in the vehicle is asleep; and
a control part that turns down sound volume of the audio part if the determination part has determined that the passenger is asleep,
wherein the audio control system further comprises
a traveling acquisition part that acquires a traveling condition of the vehicle based on at least one of a steering wheel operation and a braking operation of the vehicle,
wherein the determination part determines that the passenger is asleep if, for the passenger captured in the photographed image, movement of a head in synchronization with the traveling condition acquired by the traveling acquisition part to a predetermined degree or to more than the predetermined degree.

3. The audio control system according to claim 2, wherein the determination part further determines that the passenger is asleep if, for the passenger captured in the photographed image, a condition with eyes closed is continuously detected for a predetermined duration.

4. The audio control system according to claim 1, wherein the determination part determines that the passenger is making a call if, for the passenger captured in the photographed image, a posture in which a hand is put on a side of a head is continuously detected for a predetermined duration.

5. The audio control system according to claim 1, wherein the photographing part includes an irradiation part that irradiates infrared rays and a camera capable of photographing an image of an infrared region.

6. An audio control method including:
a photographing step of photographing a compartment of a vehicle from a front side reference position in the compartment and obtaining a photographed image that also represents a distance to an object within a photographing range in the compartment;
a determination step of determining, based on the photographed image obtained in the photographing step, whether or not a passenger other than a driver in the vehicle is making a call on a mobile phone; and
a control step of turning down sound volume of an audio part installed in the compartment if it was determined that the passenger is making a call in the determination step.

* * * * *